United States Patent
Yun

(10) Patent No.: US 9,736,453 B2
(45) Date of Patent: Aug. 15, 2017

(54) METHOD FOR ENCODING A STEREOSCOPIC IMAGE

(71) Applicant: LG INNOTEK CO., LTD., Seoul (KR)

(72) Inventor: Ji Hyun Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 826 days.

(21) Appl. No.: 13/974,953

(22) Filed: Aug. 23, 2013

(65) Prior Publication Data
US 2014/0078262 A1 Mar. 20, 2014

(30) Foreign Application Priority Data
Sep. 18, 2012 (KR) .......................... 10-2012-0103101

(51) Int. Cl.
*H04N 13/00* (2006.01)
*H04N 13/02* (2006.01)

(52) U.S. Cl.
CPC ..... *H04N 13/0048* (2013.01); *H04N 13/0051* (2013.01); *H04N 13/0239* (2013.01); *H04N 2013/0081* (2013.01); *H04N 2013/0096* (2013.01); *H04N 2213/003* (2013.01)

(58) Field of Classification Search
CPC .................. H04N 19/00927; G06T 7/0075
See application file for complete search history.

(56) References Cited

U.S. PATENT DOCUMENTS

| 5,877,865 | A * | 3/1999 | Fukuta | H04N 1/40031 358/1.5 |
| 7,999,844 | B2 * | 8/2011 | Richards | G02B 27/2228 348/42 |
| 8,606,028 | B2 * | 12/2013 | Noda | H04N 21/23892 382/232 |
| 2002/0018131 | A1 * | 2/2002 | Kochi | H04N 3/1512 348/304 |
| 2002/0154693 | A1 * | 10/2002 | Demos | H04N 19/0009 375/240.03 |
| 2004/0189796 | A1 | 9/2004 | Ho et al. | |
| 2007/0052794 | A1 * | 3/2007 | Ha | H04N 13/0022 348/42 |

(Continued)

FOREIGN PATENT DOCUMENTS

WO    WO 2012/029885 A1    3/2012

OTHER PUBLICATIONS

Fehn, "Depth-Image-Based Rendering (DIBR), Compression and Transmission for a New Approach on 3D-TV," Stereoscopic Displays and Virtual Reality Systems XI, Proceedings of the International Society for Optical Engineering, SPIE vol. 5291, No. 2, May 31, 2004, pp. 93-104 (18 pages total), XP8154309.

(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

An image processing apparatus and a camera module using the same are provided, the camera module comprises first and second sensor units each outputting left and right images, and an image processing unit configured to simultaneously encoding a depth image and a color image generated from the left and right images.

12 Claims, 4 Drawing Sheets

(56) References Cited

U.S. PATENT DOCUMENTS

| | | | |
|---|---|---|---|
| 2008/0309774 A1* | 12/2008 | Beng Goh | H04N 13/0003 348/218.1 |
| 2009/0219994 A1* | 9/2009 | Tu | H04N 19/186 375/240.08 |
| 2010/0045776 A1* | 2/2010 | Schwerdtner | G03H 1/0808 348/40 |
| 2010/0225645 A1* | 9/2010 | Suh | H04N 13/0048 345/419 |
| 2010/0309319 A1* | 12/2010 | Yanada | H04N 5/3765 348/207.1 |
| 2011/0305383 A1* | 12/2011 | Lee | H04N 19/124 382/154 |
| 2012/0084652 A1 | 4/2012 | Martinez Bauza et al. | |
| 2012/0139905 A1* | 6/2012 | Hwang | H04N 13/0497 345/419 |
| 2012/0256912 A1* | 10/2012 | Yamaguchi | H04N 13/0022 345/419 |
| 2013/0108181 A1* | 5/2013 | Wey | H04N 19/30 382/233 |
| 2013/0141534 A1 | 6/2013 | Hattori | |
| 2013/0242049 A1* | 9/2013 | Sung | H04N 13/0048 348/43 |
| 2014/0286439 A1* | 9/2014 | Yun | H04N 19/597 375/240.26 |
| 2014/0340478 A1* | 11/2014 | Kwong | H04N 19/597 348/43 |
| 2015/0116458 A1* | 4/2015 | Barkatullah | H04N 13/026 348/43 |
| 2015/0296232 A1* | 10/2015 | Hwang | H04N 21/234327 348/473 |
| 2016/0261885 A1* | 9/2016 | Li | H04N 19/176 |

OTHER PUBLICATIONS

Morvan et al., "Joint Depth/Texture Bit-Allocation for Multi-View Video Compression," Picture Coding Symposium, Nov. 7, 2007, 4 pages, XP30080430.

* cited by examiner

METHOD FOR ENCODING A STEREOSCOPIC IMAGE

CROSS-REFERENCE TO RELATED APPLICATION

The present application is based on, and claims priority from, Korean Application Number 10-2012-0103101, filed on Sep. 18, 2012, the disclosure of which is incorporated by reference herein in its entirety.

BACKGROUND OF THE INVENTION

Field of the Invention

Aspects of the present disclosure relate to an image processing apparatus and a camera module using the same.

Description of Related Art

In general, a stereo camera system uses two cameras to generate a depth image by photographing left and right images, and transmits two image data of a depth image and a color image to a host system.

In a case a high resolution camera of more than 1M pixels is applied to the stereo camera system, the depth image and the color image may generate different image resolution and output format. For example, the color image of the left and right images may have a 1280×960 resolution with an output format of YCbCr of 16 bits, and the depth image may have a 640×480 resolution with an output format of Y of 8 bits.

Thus, in a case any one of the image resolution and the output format in the color image and the depth image is different; there occurs a problem in which images cannot be simultaneously transmitted to the host system.

SUMMARY OF THE INVENTION

Exemplary aspects of the present disclosure are to substantially solve at least the above problems and/or disadvantages and to provide at least the advantages as mentioned below. Thus, the present disclosure is directed to provide an image processing apparatus configured to simultaneously transmit a depth image and a color image having one or more differences in size and format, and a camera module using the same.

In one general aspect of the present disclosure, there is provided a camera module, the camera module comprising: first and second sensor units each outputting left and right images; and an image processing unit configured to simultaneously encoding a depth image and a color image generated from the left and right images.

In some exemplary of the present invention, the camera module may further comprise a pre-processing unit configured to separate brightness information and chrominance information of the left and right images outputted from the first and second sensor units.

In some exemplary of the present invention, the image processing unit may comprise a first generation unit configured to generate the depth image from the left and right images; a second generation unit configured to generate the color image from the left and right images; and an encoding unit configured to simultaneously encode the depth image and the color image.

In some exemplary of the present invention, the image processing unit may further comprise a synchronization unit configured to synchronize an output of the first and the second generation units.

In some exemplary of the present invention, the image processing unit may further comprise an adjustment unit configured to adjust a size of the depth image generated by the first generation unit.

In some exemplary of the present invention, the second generation unit may comprise a synthesis unit configured to synthesize the left and right images.

In some exemplary of the present invention, the image processing unit may further comprise a transmission unit configured to transmit an image data encoded by the encoding unit, a pixel clock and a synchronization signal.

In some exemplary of the present invention, the encoding unit may simultaneously encode the color image and the depth image by allocating a first bit to the color image and a second bit to the depth image.

In some exemplary of the present invention, the encoding unit may encode in such a manner that four pixel clocks form two pixels for the color image and each pixel allocates data of the first bit.

In some exemplary of the present invention, the encoding unit may encode in such a manner that four pixel clocks form one pixel for the depth image and each pixel clock allocates data of the second bit.

In some exemplary of the present invention, the encoding unit may simultaneously encode the color image and the depth image by allocating a first bit to the color image and allocating a second bit to the depth image.

In some exemplary of the present invention, the encoding unit may encode in such a manner that four pixel clocks form two pixels for the color image and each pixel clock allocates data of the first bit.

In some exemplary of the present invention, the encoding unit may encode in such a manner that four pixel clocks form one pixel for the depth image, each pixel clock allocates data of the second bit, and a dummy data is encoded until the encoding of the color image is completed.

In another general aspect of the present disclosure, there is provided an image processing apparatus, the apparatus comprising: a first generation unit configured to generate a depth image from left and right images; a second generation unit configured to generate a color image from the left and right images; and an encoding unit configured to simultaneously encode the depth image and the color image.

In some exemplary of the present invention, the apparatus may further comprise a synchronization unit configured to synchronize an output of the first and the second generation units.

In some exemplary of the present invention, the apparatus may further comprise an adjustment unit configured to adjust a size of the depth image generated by the first generation unit.

In some exemplary of the present invention, the apparatus may further comprise a transmission unit configured to transmit an image data encoded by the encoding unit, a pixel clock and a synchronization signal.

In some exemplary of the present invention, the encoding unit may simultaneously encode the color image and the depth image by allocating a first bit to the color image and a second bit to the depth image.

In some exemplary of the present invention, the encoding unit may encode in such a manner that four pixel clocks form two pixels for the color image and each pixel clock allocates data of the first bit.

In some exemplary of the present invention, the encoding unit may encode in such a manner that four pixel clocks form one pixel for the depth image, each pixel clock allocates data of the second bit.

The present disclosure has an advantageous effect in that a separate number of bits are allocated to the color image and the depth image, an encoding is made to generate one image data, and the color image and the depth image are simultaneously transmitted to the host system.

DETAILED DESCRIPTION OF PREFERRED EMBODIMENTS

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 1:
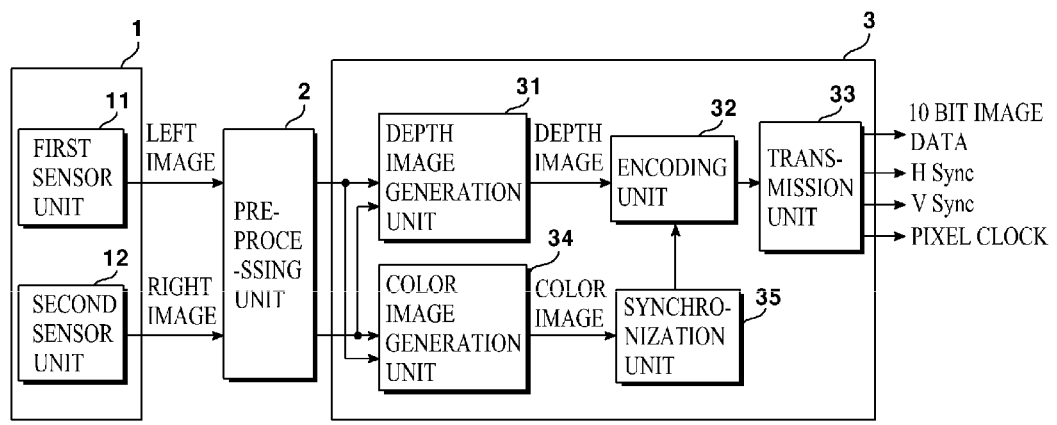
FIG. 1 is a block diagram illustrating a camera module according to a first exemplary embodiment of the present disclosure.

FIG. 1 is a block diagram illustrating a camera module according to a first exemplary embodiment of the present disclosure.

Referring to FIG. 1, the camera module according to the first exemplary embodiment of the present disclosure may comprise a camera unit (1), a pre-processing unit (2) and an image processing unit (3), where an image processed by the image processing unit (3) may be transmitted to a host system (not shown).

Because a currently used host system (not shown) is designed to receive a 10-bit image data, and an image obtained by the camera unit (1) is designed to receive a 16-bit image data, the camera unit (1) of 16-bit image data will be explained hereinafter. However, it should be apparent that the exemplary embodiments of the present disclosure are not limited to the host system and the number of bits thus explained.

The camera unit (1) comprises a first sensor unit (11) and a second sensor unit (12). The first and second sensor units (11 and 12) are arranged by being distanced from each other at a predetermined space, and each of the first and second sensor units (11 and 12) obtains one of stereo images. For example, the first sensor unit (11) may obtain a left image and the second sensor unit (12) may obtain a right image. On the other hand, the first sensor unit (11) may obtain a right image and the second sensor unit (12) may obtain a left image. In the exemplary embodiment of the present disclosure, explanation will be provided to the effect that the first sensor unit (11) obtains a left image and the second sensor unit (12) obtains a right image for the convenience sake.

The first sensor unit (11) and the second sensor unit (12) may be a camera sensor including a CCD (Charge Coupled Device) and a CMOS (Complementary Metal-Oxide Semiconductor), for example, but the present disclosure is not limited thereto, and other devices may be used that performs similar functions.

The first sensor unit (11) and the second sensor unit (12) may output a RGB image of 8-bit.

The pre-processing unit (2) may convert the RGB image of 8-bit outputted by the first and second sensor units (11 and 12) to an YCbCr image of 16-bit. At this time, the pre-processing unit (2) may sequentially output an Y signal of 8-bit and each of Cb and Cr signal of 8-bit (i.e., Y→Cb→Y→Cr). That is, it can be understood that a 16-bit data is allocated to a 8-bit, details of which is well known to the skilled in the art, and therefore no more detailed explanation will be omitted hereinafter. Furthermore, the number of bits explained in the exemplary embodiment of the present disclosure is exemplary, and it should be apparent that the exemplary embodiment of the present disclosure is not limited thereto.

Still furthermore, although the exemplary embodiment of the present disclosure has explained that the camera unit (1) and the pre-processing unit (2) are separately disposed, the first and second sensor units (11 and 12) of the camera unit (1) may directly output the YCbCr image of 16-bit. The first and second sensor units (11 and 12) may output an RGB image, and may output an YCbCr image. At this time, Y defines a brightness degree, and CbCr defines chrominance information, details of which are well known art to the skilled in the art and detailed explanation thereto is omitted hereinafter.

Referring to FIG. 1 again, the image processing unit (3) according to the exemplary embodiment of the present disclosure may comprise a depth image generation unit (31), an encoding unit (32), a transmission unit (33), a color image generation unit (34) and a synchronization unit (35).

The depth image generation unit (31) may generate a depth image from the left and right images received from the camera unit (1). The first and second sensor units (11, 12) have a predetermined base line relative to a horizontal direction, such that images outputted from the first and second sensor units (11 and 12) have disparity, and the depth image generation unit (31) generates the depth image using a difference of the disparity of the two images.

The depth image generation unit (31) may generate the depth image using a stereo matching, for example, but the present disclosure is not limited thereto, and may be used with various methods capable of generating the depth image.

In the first exemplary embodiment of the present disclosure, size of the depth image generated by the depth image generation unit (31) is same as that of the left and right images obtained by the camera unit (1), but may be different in format thereof. That is, when the left and right YCbCR images of 16-bit with a predetermined size is inputted into the image processing unit (3), the depth image generation unit (31) may generate the Y depth image of 8-bit with the same size.

The color image generation unit (34) may output the color image by synthesizing the left and right images, or may output the color image by bypassing one of the inputted left and right images.

Figure 2:
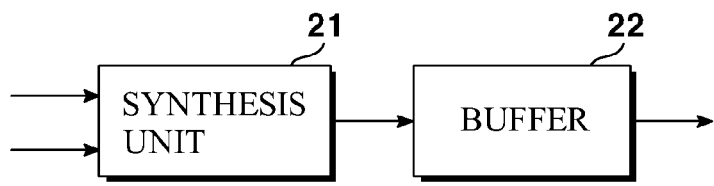
FIG. 2 is a block diagram illustrating a color image generation unit of FIG. 1 according to an exemplary embodiment of the present disclosure.
Figure 3:
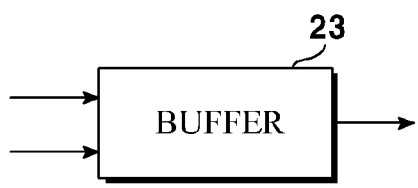
FIG. 3 is a detailed block diagram illustrating a color image generation unit of FIG. 1 according to another exemplary embodiment of the present disclosure.

FIGS. 2 and 3 are detailed block diagrams illustrating the color image generation unit (34) of FIG. 1, where FIG. 2 is a block diagram illustrating the color image generation unit that transmits a 3-D image as the color image, and FIG. 3 is a block diagram illustrating the color image generation unit that transmits a 2-D image as the color image.

Referring to FIG. 2, the color image generation unit (34) according to the exemplary embodiment of the present disclosure may comprise a synthesis unit (21) and a buffer (22).

The synthesis unit (21) synthesizes the inputted left and right images. The type of synthesizing the left and right images by the synthesis unit (21) may be a side-by-side type, and may be an up-down type, and the present disclosure is not limited to any one method.

In a case the synthesis unit (21) synthesizes the color image by using the side-by-side type, it should be apparent that the size is twice the widthwise length comparing to the left and right images. Furthermore, in a case the synthesis unit (21) synthesizes the color image by using the up-down type, it should be apparent that the size is twice the lengthwise length comparing to the left and right images.

The buffer (22) may receive the color image synthesized by the synthesis unit (21), temporarily store and output the synthesized color image. The buffer (22) may be a frame buffer, or may be a line buffer.

Further, as illustrated in FIG. 3, the color image generation unit (34) according to an exemplary embodiment of the present disclosure may comprise a buffer (23). In this case, the buffer (23) may output any one of the left and right images as the color image. The buffer (23) may be a frame buffer, or may be a line buffer, either.

The synchronization unit (23) may perform a synchronization of the depth image and the color image, because time for generation of the depth image by the depth image generation unit (31) and time for generation of the color image by the color image generation unit (34) are not same. That is, because the time for generation of the color image is longer than the time for generation of the depth image, the synchronization unit (23) may output the color image to the encoding unit by delaying a predetermined time. The time for delaying the color image by the synchronization unit (23) may be determined in consideration of the color image generation time by the color image generation unit (34) and the depth image generation time by the depth image generation unit (31), and may be set up in advance.

The encoding unit (32) may simultaneously encode the color image and the depth image in a predetermined bit number. For example, as explained above, in a case the left and right images received from the pre-processing unit (2) are respectively 8-bit, and the host system receives 10-bit image data, the number of bits for the color image and the depth image are 8-bits.

In this case, the encoding unit (32) may allocate 8-bit to the color image, allocate 2-bit to the depth image and encode the color image and the depth image to 10-bit image data. However, the number of bits is limited in the exemplary embodiment of the present disclosure, and the different number of bits may be allocated to the color image and the depth image using different methods. That is, the same number of bits as that of original image may be allocated to the color image, and the number of bits except for the color image may be allocated to the depth image, by calculating the number of bits receivable from the host system.

Although the exemplary embodiment of the present disclosure has explained and illustrated that the encoding unit (32) simultaneously encode the color image and the depth image, the present disclosure is not limited thereto, and any one of the color image and the depth image may be encoded.

An encoding method of the encoding unit (32) according to the exemplary embodiment of the present disclosure will be explained in detail later with reference to the drawings.

The transmission unit (33) may transmit to the host system (not shown) the image data encoded by the encoding unit (32) along with a clock and a synchronizing signal. At this time, the clock may define a processing standard of pixel data (pixel clock), and the synchronizing signal may include a first synchronizing signal (H sync) configured to indicate that one scan line in the image data has been completed in transmission, and a second synchronizing signal (V sync) indicating that one frame has been completed in transmission.

The transmission unit (33) may transmit to the host system a signal defined in various types according to communication methods. That is, the transmission unit (33) may transmit an image data in parallel, or may transmit the image data in serial method, for example.

Figure 4:
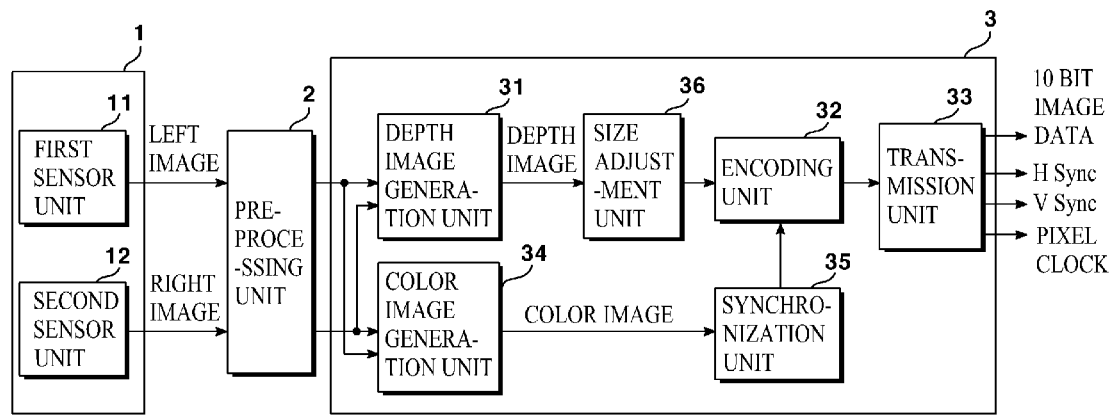
FIG. 4 is a block diagram illustrating a camera module according to a second exemplary embodiment of the present disclosure.

FIG. 4 is a block diagram illustrating a camera module according to a second exemplary embodiment of the present disclosure.

Referring to FIG. 4, a camera module according to the second exemplary embodiment of the present disclosure may comprise a camera unit (1), a pre-processing unit (2) and an image processing unit (3), where an image processed by the image processing (3) may be transmitted to a host system (not shown).

The image processing unit (3) in the second exemplary embodiment of the present disclosure illustrated in FIG. 4 may further comprise a size adjustment unit (36), in addition to the configuration of the first exemplary embodiment of FIG. 1. Other configurations are almost identical to that of the first exemplary embodiment, such that explanation will be focused on the size adjustment unit (36) of the image processing unit (3).

The size adjustment unit (36) may adjust a size of the depth image outputted from the depth image generation unit (31). For example, the size adjustment unit (36) may reduce the size of the depth image by ½ or by ¼.

Although the size of the depth image generated by the depth image generation unit (31) in the second exemplary embodiment is same as that of left and right images obtained by the camera unit (1), but different in format thereof, the size of the depth image is adjusted by the size adjustment unit (36). That is, in a case the left and right YCbCr images of 16-bit with a predetermined size (e.g., 1280×960) is inputted to the image processing unit (3), the depth image generation unit (31) may generate a Y depth image of 8-bit with a size of 640×480 (½) or a size of 320×240 (¼).

The encoding unit (32) may simultaneously or respectively encode the size-changed depth image and the color image.

Now, the encoding of the encoding unit (32) will be explained using examples.

Figure 5:
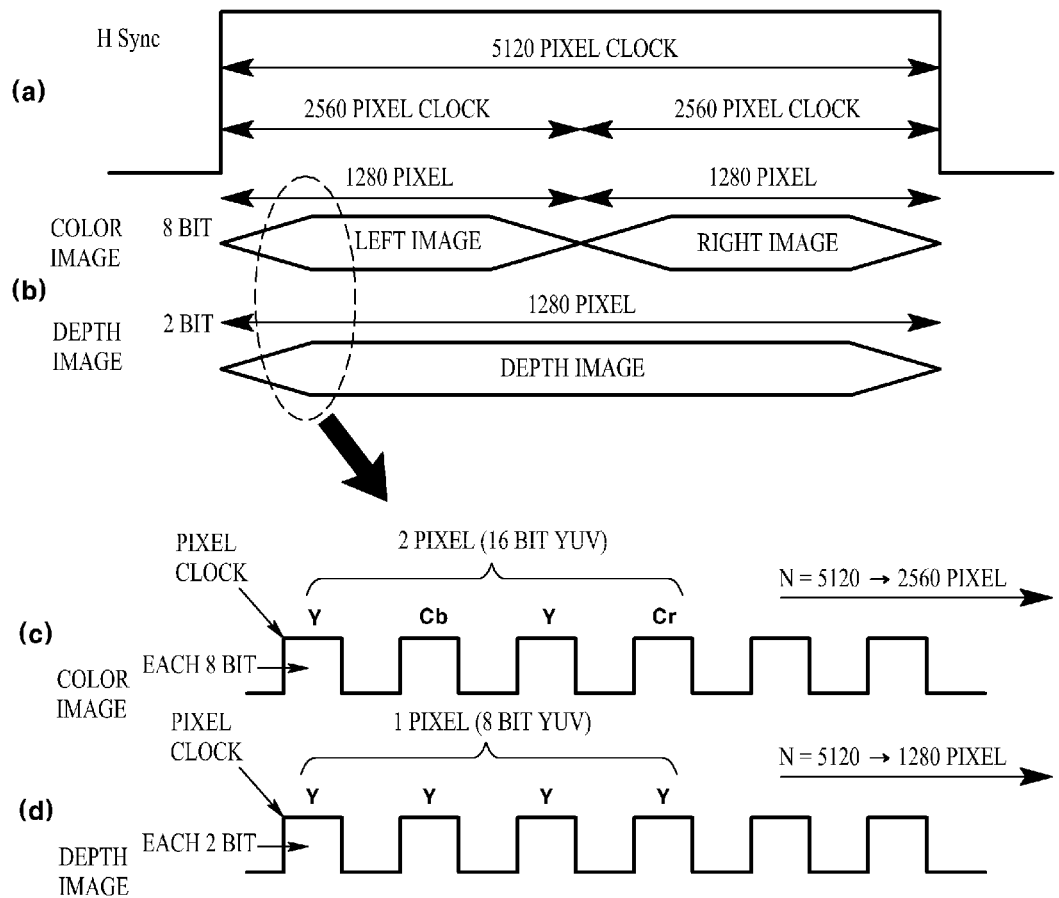
FIG. 5 is an exemplary view explaining an encoding according to an exemplary embodiment of the present disclosure.

FIG. 5 is an exemplary view explaining an encoding according to an exemplary embodiment of the present disclosure, where sizes of the left and right images and depth image are identically 1280×960. That is, FIG. 4 illustrates a method as encoded by the camera module of FIG. 1.

The image size of 1280×960 means that size of frame is 1280×960, and also means that the frame includes 1280 pixels and 960 scan lines. A twice-the pixel clock (2560 pixels) is required to transmit 1280 pixels of YCbCr image.

Referring to FIG. 5(c), the encoding unit (32) according to the exemplary embodiment of the present disclosure may encode the color image in such a manner that 1 clock of Y 8-bit, 1 clock of Cb 8-bit, 1 clock of Y 8-bit and 1 clock of Cr 8-bit form 2-pixel. That is, the encoding may be performed in such a manner that 4 pixel clocks form two pixels. Each pixel clock may be formed to allocate 8-bit data. The color image is an image that is synthesized with the left and right images, such that H sync indicating one scan line may be formed with 5120 pixel clocks.

Meanwhile, the depth image is also formed with a Y signal of 8-bit per pixel, and the encoding unit (32) according to the exemplary embodiment of the present disclosure may encode in such a manner that the Y signal of 8-bit is allocated with 2-bit data for each pixel clock, as shown in FIG. 5(d). That is, the encoding is performed to allow 1 clock of Y 2-bit, 1 clock of Y 2-bit, 1 clock of Y 2-bit and 1 clock of Y 2-bit to form one pixel. That is, the encoding may be performed in such a manner that 4 pixel clocks form one pixel.

In a case the color image synthesized from the left and right images forms one scan line using 5120 pixel clocks according to the encoding thus described as shown in FIGS. 5(a) and 5(b), the color image and the depth image can be synchronized, because the encoding is made to allow 4 pixel clocks to form one pixel in the depth image.

Figure 6:
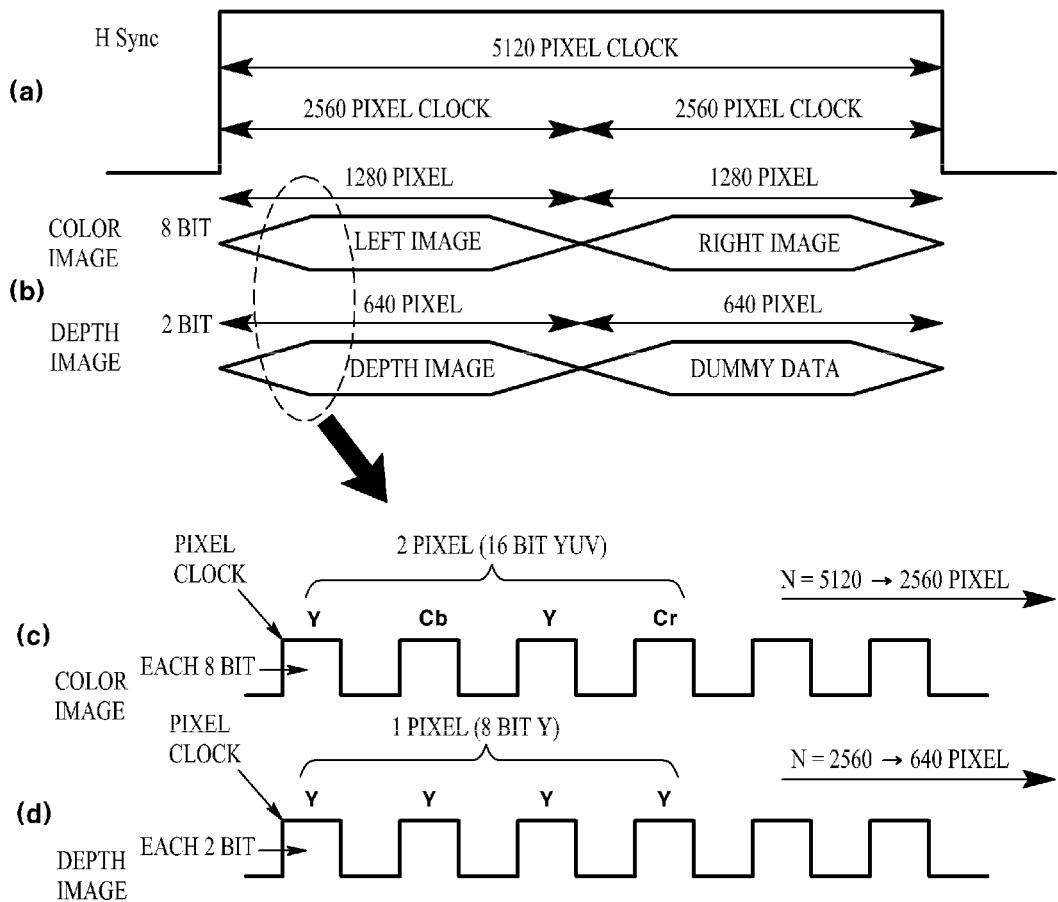
FIG. 6 is an exemplary view explaining an encoding according to an exemplary embodiment of the present disclosure.

FIG. 6 is an exemplary view explaining an encoding method according to an exemplary embodiment of the present disclosure, where each size of the left and right images is 1280×960, and a size of depth image is 640×480. That is, the depth image of the size adjustment unit (36) in the second exemplary embodiment of FIG. 4 is reduced to ½.

It can be noted from the exemplary embodiment of the present disclosure illustrated in FIG. 6 that only difference from FIG. 5 is an encoding of the depth image. That is, 4 pixel clocks form one pixel in the depth image and 2-bit data is allocated to each pixel clock in FIG. 5, whereas in the exemplary embodiment illustrated in FIG. 6, 1 pixel can constitute 4 pixel clocks relative to 640 pixels, because size of the depth image is reduced by ½. Thus, the dummy data of the depth image can be encoded until encoding of color image of relevant scan line is completed by allocating a 2-bit data to each pixel clock, whereby synchronization is enabled.

Although the exemplary embodiment illustrated in FIG. 6 has explained a case where the size adjustment unit (36) reduces the depth image by ½, the dummy data of the depth image may be encoded until encoding of color image of relevant scan line is completed by forming 1 pixel with 4 pixel clocks relative to 320 pixels, allocating a 2-bit data to each pixel clock, in a case the size adjustment unit (36) reduces the depth image by ¼.

The host system receiving the image data transmitted according to the exemplary embodiments of the present disclosure thus explained can perform the decoding with reference to the abovementioned format. That is, the decoded data can be provided to an image processing apparatus by decoding a 8-bit to color image relative to the received 10-bit image data, and decoding a 2-bit to depth image.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A method for encoding a stereoscopic image, the method comprising:
   acquiring a left image using a first sensor unit:
   acquiring a right image using a second sensor unit;
   generating a depth image based on the left and right images;
   generating a color image having an original number of bits based on the left and right images;
   simultaneously encoding the depth image and the color image into a single data unit having a predetermined bit number size;
   transmitting the single data unit to a host system,
   wherein the predetermined bit number size of the single data unit for the host system is different than a bit number size of the left and right images acquired from the first and second sensor units, and
   wherein bits within the single data unit having the predetermined bit number size are allocated to the color image having the original number of bits and a remaining number of bits within the single data unit, other than the bits within the single data unit allocated to the color image, are allocated to the depth image, based on calculating a number of bits receivable by the host system.

2. The method of claim 1, further comprising:
   obtaining brightness information and chrominance information of the left and right images acquired from the first and second sensor units.

3. The method of claim 1, further comprising:
   synchronizing the depth image and the color image.

4. The method of claim 1, further comprising:
   adjusting a size of the depth image.

5. The method of claim 4, wherein the encoding includes simultaneously encoding the color image and the depth image by allocating a first bit to the color image and allowing a second bit to the depth image.

6. The method of claim 5, wherein the encoding includes encoding by allowing four pixel clocks to form two pixels relative to the color image and allowing each pixel clock to be allocated with data of a first bit.

7. The method of claim 6, wherein the encoding includes encoding by allowing four pixel clocks to form one pixel relative to the depth image and allowing each pixel clock to be allocated with data of two bits.

8. The method of claim 1, wherein the generating the color image includes synthesizing the left and right images.

9. The method of claim 1, further comprising:
   transmitting a pixel clock and a synchronization signal with the single data unit to the host system.

10. The method of claim 1, wherein the encoding includes simultaneously encoding the color image and the depth image by allocating a first plurality of bits to the color image and a second plurality of bits to the depth image.

11. The method of claim 10, wherein the encoding includes allowing four pixel clocks to form two pixels relative to the color image, and
    wherein each pixel clock encodes and allocates data of the first plurality of bits.

12. The method of claim 11, wherein the encoding includes allowing four pixel clocks to form one pixel relative to the depth image, and
    wherein each pixel clock encodes and allocates data of the second plurality bits.

* * * * *